(12) United States Patent
Tseng et al.

(10) Patent No.: US 12,545,760 B2
(45) Date of Patent: *Feb. 10, 2026

(54) URETHANE RESIN COMPOSITION, FILM, AND SYNTHETIC LEATHER

(71) Applicant: DIC Corporation, Tokyo (JP)

(72) Inventors: Yayi Tseng, Osaka (JP); Ryo Maeda, Osaka (JP)

(73) Assignee: DIC Corporation, Tokyo (JP)

( * ) Notice: Subject to any disclaimer, the term of this patent is extended or adjusted under 35 U.S.C. 154(b) by 531 days.

This patent is subject to a terminal disclaimer.

(21) Appl. No.: 18/012,229

(22) PCT Filed: Jun. 10, 2021

(86) PCT No.: PCT/JP2021/022019
§ 371 (c)(1),
(2) Date: Dec. 22, 2022

(87) PCT Pub. No.: WO2021/261259
PCT Pub. Date: Dec. 30, 2021

(65) Prior Publication Data
US 2023/0272153 A1    Aug. 31, 2023

(30) Foreign Application Priority Data
Jun. 23, 2020 (JP) ................. 2020-107645

(51) Int. Cl.
| C08G 18/44 | (2006.01) |
| C08G 18/08 | (2006.01) |
| C08G 18/12 | (2006.01) |
| C08G 18/22 | (2006.01) |
| C08G 18/42 | (2006.01) |
| C08G 18/66 | (2006.01) |
| C08G 18/72 | (2006.01) |
| C08G 18/73 | (2006.01) |
| C08G 18/75 | (2006.01) |
| C08G 64/02 | (2006.01) |
| C08G 64/20 | (2006.01) |
| C08L 75/04 | (2006.01) |
| D06N 3/14 | (2006.01) |

(52) U.S. Cl.
CPC ......... *C08G 18/44* (2013.01); *C08G 18/0823* (2013.01); *C08G 18/12* (2013.01); *C08G 18/227* (2013.01); *C08G 18/4202* (2013.01); *C08G 18/6659* (2013.01); *C08G 18/722* (2013.01); *C08G 18/73* (2013.01); *C08G 18/755* (2013.01); *C08G 18/758* (2013.01); *C08G 64/0208* (2013.01); *C08G 64/20* (2013.01); *C08L 75/04* (2013.01); *D06N 3/14* (2013.01); *D06N 3/146* (2013.01); *C08L 2203/16* (2013.01); *D06N 2211/28* (2013.01)

(58) Field of Classification Search
CPC .... C08G 18/44; C08G 18/0823; C08G 18/12; C08G 18/6659; C08G 18/227; C08G 18/4202; C08G 18/722; C08G 18/73; C08G 18/755; C08G 18/758; C08G 64/0208; C08G 64/20; C08L 75/04; C08L 2203/16; D06N 3/146; D06N 2211/28; D06N 3/14

See application file for complete search history.

(56) References Cited

U.S. PATENT DOCUMENTS

| 2013/0109804 A1 | 5/2013 | Kusaka et al. |
| 2019/0375935 A1 | 12/2019 | Shikuri et al. |

FOREIGN PATENT DOCUMENTS

| EP | 3398980 | 11/2018 | |
| EP | 3459987 | 3/2019 | |
| EP | 3591116 | 1/2020 | |
| JP | 2016027114 | 2/2016 | |
| JP | 2016027119 | 2/2016 | |
| JP | 2016222921 | 12/2016 | |
| JP | 2017133024 | 8/2017 | |
| KR | 101810267 B1 * | 12/2017 | ........... D06N 3/0088 |
| WO | 2017115549 | 7/2017 | |

OTHER PUBLICATIONS

"International Search Report (Form PCT/ISA/210) of PCT/JP2021/022019," mailed on Aug. 24, 2021, with English translation thereof, pp. 1-6.

* cited by examiner

*Primary Examiner* — Rabon A Sergent
(74) *Attorney, Agent, or Firm* — JCIPRNET

(57) ABSTRACT

The present invention provides a urethane resin composition including an anionic urethane resin (X) and water (Y), in which the anionic urethane resin (X) is produced using, as raw materials, a polycarbonate polyol (A-1) produced using biomass-derived decanediol as a raw material, and a polycarbonate polyol (A-2) produced using a biomass-derived dihydroxy compound having a cyclic ether structure as a raw material. The polycarbonate polyol (A-1) is preferably produced further using butanediol as a raw material. In the polycarbonate polyol (A-1), the molar ratio [(C4)/(C10)] of the butanediol (C4) to the biomass-derived decanediol (C10) is preferably within a range of 50/50 to 98/2.

8 Claims, No Drawings

URETHANE RESIN COMPOSITION, FILM, AND SYNTHETIC LEATHER

CROSS-REFERENCE TO RELATED APPLICATION

This application is a 371 application of an international PCT application serial no. PCT/JP2021/022019, filed on Jun. 10, 2021, which claims the priority benefit of Japan application JP2020-107645, filed on Jun. 23, 2020. The entirety of each of the above-mentioned patent applications is hereby incorporated by reference herein and made a part of this specification.

TECHNICAL FIELD

The present invention relates to a urethane resin composition, a film, and a synthetic leather.

BACKGROUND ART

Urethane resin compositions in which a urethane resin is dispersed in water can reduce environmental loads better than conventional organic solvent-based urethane resin compositions, and therefore, have recently started to be suitably used as materials for manufacturing synthetic leather (including artificial leather), gloves, coating agents for curtains, sheets, and the like. Furthermore, in recent years, against the backdrop of global warming and depletion of petroleum resources, global demand for biomass raw materials such as plants has been increasing to reduce the amount of usage of fossil resources such as petroleum.

High durability is required of the urethane resin compositions, in particular, when the urethane resin compositions are used for synthetic leather used as interior materials for vehicles. Evaluation items of such durability are manifold, and examples of the evaluation items include heat resistance, moist heat resistance, light resistance, chemical resistance, and abrasion resistance (for example, see PTL 1). Of these evaluation items, resistance to oleic acid contained in sebum is strongly required because synthetic leather frequently comes into contact with the human body. However, it has been pointed out that an aqueous urethane resin is inferior in oleic acid resistance to solvent-based urethane resin.

Furthermore, in recent years, with uses in cold climate regions in mind, the level of requirement for flexibility at low temperature is increasing.

CITATION LIST

Patent Literature

PTL 1: Japanese Unexamined Patent Application Publication No. 2016-222921

SUMMARY OF INVENTION

Technical Problem

An object of the present invention is to provide a urethane resin composition including water, the urethane resin composition being produced using a biomass raw material and having high abrasion resistance, high oleic-acid resistance, and excellent low-temperature flexibility.

Solution to Problem

The present invention provides a urethane resin composition including an anionic urethane resin (X) and water (Y), in which the anionic urethane resin (X) is produced using, as raw materials, a polycarbonate polyol (A-1) produced using biomass-derived decanediol as a raw material, and a polycarbonate polyol (A-2) produced using a biomass-derived dihydroxy compound having a cyclic ether structure as a raw material.

Furthermore, the present invention provides a dry film formed from the urethane resin composition, and a synthetic leather including the film.

Advantageous Effects of Invention

The urethane resin composition according to the present invention includes water, and is produced further using a biomass-derived raw material, hence is an environment-responsive material, and is capable of forming a film having high abrasion resistance, high oleic-acid resistance, and excellent low-temperature flexibility.

DESCRIPTION OF EMBODIMENTS

The urethane resin composition according to the present invention includes: an anionic urethane resin (X) produced using an essential specific raw material; and water (Y).

To achieve high abrasion resistance, high oleic-acid resistance, and excellent low-temperature flexibility, the anionic urethane resin (X) is produced using, as essential raw materials, a polycarbonate polyol (A-1) produced using biomass-derived decanediol as a raw material, and a polycarbonate polyol (A-2) produced using a biomass-derived dihydroxy compound having a cyclic ether structure as a raw material. When the polycarbonate polyol (A-1) is not used, low-temperature flexibility, in particular, is poor. When the polycarbonate polyol (A-2) is not used, abrasion resistance, in particular, is poor.

From the viewpoint of achieving higher abrasion resistance, higher oleic-acid resistance, and more excellent low-temperature flexibility, the mass ratio [(A-1)/(A-2)] of the polycarbonate polyol (A-1) to the polycarbonate polyol (A-2) is preferably within a range of 98/2 to 40/60, and more preferably within a range of 95/5 to 60/40.

As the polycarbonate polyol (A-1) produced using the biomass-derived decanediol as a raw material, for example, a reaction product of a glycol compound including the biomass-derived decanediol with carbonate and/or phosgene can be used, and specifically, a polycarbonate polyol described in Japanese Unexamined Patent Application Publication No. 2018-127758 can be used.

From the viewpoint of achieving higher oleic acid resistance and more excellent low-temperature flexibility, 1,10-decanediol is preferably used as the decanediol.

Examples of a glycol compound that can be used, other than the decanediol, include ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 1,6-hexanediol, 1,5-hexanediol, 3-methyl-1,5-pentanediol, 2-methyl-1,8-octanediol, 1,7-heptanediol, 1,8-octanediol, 1,9-nonanediol, 1,8-nonanediol, 2-ethyl-2-butyl-1,3-propanediol, 1,12-dodecanediol, 1,4-cyclohexanedimethanol, 1,3-cyclohexanedimethanol, trimethylolpropane, trimethylolethane, glycerin, and ε-caprolactone. These compounds may be used alone or in combination of two or more. Of these compounds, butanediol is preferably used, and 1,4-butanediol is more preferably used, from the viewpoint of achieving higher oleic acid resistance and more excellent low-temperature flexibility.

In the case where the biomass-derived decanediol and the butanediol are used in combination, the total amount of the biomass-derived decanediol and the butanediol used in the glycol compound is preferably 50 mol % or more, more preferably 70 mol % or more, and still more preferably 80 mol % or more.

In the case where the biomass-derived decanediol (010) and the butanediol (C4) are used in combination, the molar ratio [(C4)/(C10)] is preferably within a range of 50/50 to 98/2, and more preferably within a range of 75/25 to 95/5, from the viewpoint of achieving higher oleic acid resistance and more excellent low-temperature flexibility.

Examples of the carbonate that can be used include dimethyl carbonate, diethyl carbonate, diphenyl carbonate, ethylene carbonate, and propylene carbonate. These compounds may be used alone or in combination of two or more.

From the viewpoint of achieving higher oleic acid resistance and more excellent low-temperature flexibility, the number average molecular weight of the polycarbonate polyol (A-1) is preferably within a range of 500 to 100,000, more preferably within a range of 700 to 10,000, and still more preferably within a range of 1,500 to 4,000. Note that the number average molecular weight of the polycarbonate polyol (A-1) is a value determined by gel permeation chromatography (GPC).

Preferable examples of the polycarbonate polyol (A-1) that are commercially available include "BENEBiOL NL-3010DB", manufactured by Mitsubishi Chemical Corporation.

As the polycarbonate polyol (A-2) produced using the biomass-derived dihydroxy compound having the cyclic ether structure, for example, a reaction product of a glycol compound including the biomass-derived dihydroxy compound having the cyclic ether structure with carbonate and/or phosgene can be used, and specifically, a polycarbonate polyol described in Japanese Unexamined Patent Application Publication No. 2017-133024 can be used.

Examples of the dihydroxy compound having the cyclic ether structure that can be used include isosorbide, isomannide, and isoidide. These compounds may be used alone or in combination of two or more. Of these compounds, isosorbide is preferably used from the viewpoint of achieving higher abrasion resistance.

Examples of a glycol compound that can be used, other than the dihydroxy compound, include ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 1,6-hexanediol, 1,5-hexanediol, 3-methyl-1,5-pentanediol, 2-methyl-1,8-octanediol, 1,7-heptanediol, 1,8-octanediol, 1,9-nonanediol, 1,8-nonanediol, 2-ethyl-2-butyl-1,3-propanediol, 1,12-dodecanediol 1,4-cyclohexanedimethanol, 1,3-cyclohexanedimethanol, trimethylolpropane, trimethylolethane, glycerin, and ε-caprolactone. These compounds may be used alone or in combination of two or more. Of these compounds, butanediol and/or hexanediol are preferably used from the viewpoint of achieving higher abrasion resistance.

In the case where the biomass-derived dihydroxy compound having the cyclic ether structure and the butanediol and/or the hexanediol are used in combination, the total amount of the biomass-derived dihydroxy compound and the butanediol and/or the hexanediol used in the glycol compound is preferably 50 mol % or more, more preferably 70 mol % or more, and still more preferably 80 mol % or more.

In the case where the glycol compound (ISB) that can be used, other than the biomass-derived dihydroxy compound, and butanediol (C4) and/or hexanediol (C6) are used in combination, the molar ratio [(C4+C6)/(ISB)] is preferably within a range of 30/70 to 90/10, more preferably within a range of 40/60 to 80/20, and still more preferably within a range of 50/50 to 70/30, from the viewpoint of achieving higher oleic-acid resistance and more excellent low-temperature flexibility.

Examples of the carbonate that can be used include dimethyl carbonate, diethyl carbonate, diphenyl carbonate, ethylene carbonate, and propylene carbonate. These compounds may be used alone or in combination of two or more.

From the viewpoint of achieving higher abrasion resistance, the number average molecular weight of the polycarbonate polyol (A-2) is preferably within a range of 400 to 100,000, more preferably within a range of 450 to 5,000, and still more preferably within a range of 500 to 2,000. Note that the number average molecular weight of the polycarbonate polyol (A-2) is a value determined by gel permeation chromatography (GPC).

Preferable examples of the polycarbonate polyol (A-2) that are commercially available include "BENEBiOL HS0830B", "BENEBiOL HS0840B", "BENEBiOL HS0840H", and "BENEBiOL HS0850H", manufactured by Mitsubishi Chemical Corporation.

Specific examples of the anionic urethane resin (X) that can be used include a reaction product of the polyol (A), the polyisocyanate (B), an anionic group-containing compound (C), and, if necessary, a chain extender (D).

Examples of polyols that can be used as the polyol (A), other than the polycarbonate polyols (A-1) and (A-2), include polyester polyols, polyether polyols, polybutadiene polyols, and polycarbonate polyols other than the polycarbonate polyols (A-1) and (A-2). These polyols may be used alone or in combination of two or more.

The total amount of the polycarbonate polyol (A-1) and the polycarbonate polyol (A-2) used in the polyol (A) is preferably 60% by mass or more, more preferably 80% by mass or more, still more preferably 90% by mass or more, and particularly preferably 95% by mass or more.

The amount of the polyol (A) used is preferably within a range of 73.4% to 85.3% by mass, and more preferably within a range of 76.9% to 81.2% by mass, based on the total amount of the raw materials constituting the anionic urethane resin (X).

Examples of the polyisocyanate (B) that can be used include: aliphatic polyisocyanates, such as hexamethylene diisocyanate and lysine diisocyanate; alicyclic polyisocyanates, such as cyclohexane diisocyanate, isophorone diisocyanate, dicyclohexylmethane diisocyanate, tetramethylxylylene diisocyanate, and norbornene diisocyanate; and phenylene diisocyanate, toluene diisocyanate, diphenylmethane diisocyanate, xylylene diisocyanate, naphthalene diisocyanate, polymethylene polyphenyl polyisocyanate, and carbodiimidated diphenylmethane polyisocyanate. These polyisocyanates may be used alone or in combination of two or more.

The amount of the polyisocyanate (B) used is preferably within a range of 14.1% to 23.8% by mass, and more preferably within a range of 17.7% to 21.0% by mass, based on the total amount of the raw materials constituting the anionic urethane resin (X).

Examples of the anionic group-containing compound (C) that can be used include: carboxyl group-containing compounds, such as 2,2-dimethylolpropionic acid, 2,2-dimethylolbutanoic acid, 2,2-dimethylolbutyric acid, and 2,2-dimethylolvaleric acid; and sulfonyl group-containing compounds, such as 3,4-diaminobutanesulfonic acid, 3,6- diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, and N-(2-aminoethyl)-β-alanine, and salts thereof. These compounds may be used alone or in combination of two or more.

The amount of the anionic group-containing compound (C) used is preferably within a range of 1.3% to 3.9% by mass, and more preferably within a range of 2.2% to 3.2% by mass, based on the total amount of the raw materials constituting the anionic urethane resin (X).

The chain extender (D) has a molecular weight of less than 500 (preferably within a range of 50 to 450). Examples of the chain extender (D) that can be used include: amino group-containing chain extenders (dl), such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, 1,4-cyclohexanediamine, and hydrazine; and hydroxyl group-containing chain extenders (a2-1), such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, 4,4'-dihydroxydiphenyl ether, and trimethylolpropane. These chain extenders may be used alone or in combination of two or more. Note that the molecular weight of the chain extender (D) is a chemical formula weight calculated from a chemical formula.

As the chain extender (D), the amino group-containing chain extenders (dl) are preferably used, and piperazine and/or isophoronediamine are more preferably used, from the viewpoint of achieving higher oleic-acid resistance and more excellent low-temperature flexibility.

The amount of the chain extender (D) used is preferably within a range of 0.54% to 2.78% by mass, and more preferably within a range of 1.20% to 2.04% by mass, based on the total amount of the raw materials constituting the anionic urethane resin (X).

Examples of a method for producing the anionic urethane resin (X) include: a method in which the polyol (A) as a raw material, the polyisocyanate (B), the anionic group-containing compound (C), and, if necessary, the chain extender (D) are mixed at once and allowed to react; and a method in which the polyol (A), the polyisocyanate (B), and the anionic group-containing compound (C) are allowed to react, thereby obtaining a urethane prepolymer having an isocyanate group, and subsequently the urethane prepolymer is allowed to react with the chain extender (D). Of these methods, the latter method is preferably employed from the viewpoint of ease of reaction control.

Each of the above-mentioned reactions is performed, for example, at a temperature of 50° C. to 100° C. for 30 minutes to 10 hours.

When the anionic urethane resin (X) is produced, an isocyanate group remaining in the anionic urethane resin (X) may be deactivated. To deactivate the isocyanate group, an alcohol having one hydroxyl group, such as methanol, is preferably used. The amount of the alcohol used is, for example, within a range of 0.001 to 10 parts by mass with respect to 100 parts by mass of the anionic urethane resin (X).

When the anionic urethane resin (X) is produced, an organic solvent may be used. Examples of the organic solvent that can be used include: ketone compounds, such as acetone and methyl ethyl ketone; ether compounds, such as tetrahydrofuran and dioxane; acetate compounds, such as ethyl acetate and butyl acetate; nitrile compounds, such as acetonitrile; and amide compounds, such as dimethylformamide and N-methylpyrrolidone. These organic solvents may be used alone or in combination of two or more. Note that the organic solvent is preferably removed in the end, for example, by a distillation method.

The content of the urethane resin (X) in the urethane resin composition is, for example, within a range of 10% to 60% by mass.

Examples of the water (Y) that can be used include ion-exchanged water and distilled water. These types of water may be used alone or in combination of two or more. The content of the water (Y) is, for example, within a range of 35% to 85% by mass.

The urethane resin composition according to the present invention includes the anionic urethane resin (X) and the water (Y), and may further include other additives, if necessary.

Examples of the other additives that can be used include a neutralizer, a cross-linking agent, a thickener, a urethanization catalyst, a filler, a foaming agent, a pigment, a dye, an oil repellent, a hollow foam, a flame retardant, a defoaming agent, a leveling agent, and an anti-blocking agent. These additives may be used alone or in a combination of two or more.

In the present invention, from the viewpoint of achieving higher hydrolysis resistance, higher oleic acid resistance, and more excellent low-temperature flexibility, the urethane resin composition is preferably devoid of an emulsifier (Z).

Examples of the emulsifier (Z) include: nonionic emulsifiers, such as polyoxyethylene nonylphenyl ether, polyoxyethylene lauryl ether, polyoxyethylene styrylphenyl ether, polyoxyethylene sorbitol tetraoleate, and polyoxyethylene-polyoxypropylene copolymers; anionic emulsifiers, such as fatty acid salts including sodium oleate, alkyl sulfates, alkyl benzenesulfonates, alkyl sulfosuccinates, naphthalene sulfonates, polyoxyethylene alkyl sulfates, sodium alkane sulfonates, and sodium alkyl diphenyl ether sulfonates; and cationic emulsifiers, such as alkyl amine salts, alkyl trimethyl ammonium salts, and alkyl dimethyl benzyl ammonium salts.

The acid value of the anionic urethane resin (X) is preferably within a range of 5 to 15 mgKOH/g from the viewpoint of achieving higher hydrolysis resistance, higher oleic acid resistance, and more excellent low-temperature flexibility, and also achieving good emulsifiability even without using the emulsifier (Z) and achieving post-emulsification liquid stability. The acid value of the anionic urethane resin (X) can be adjusted using the amount of the anionic group-containing compound (C) used as a raw material. Note that a method for measuring the acid value of the anionic urethane resin (X) will be described later in Examples.

As described above, the urethane resin composition according to the present invention is an environment-responsive material including water, and is capable of forming a film having high abrasion resistance, high oleic acid resistance, and excellent low-temperature flexibility. Furthermore, when satisfying a specific requirement, the urethane resin composition is capable of forming the film also having high hydrolysis resistance. Hence, the urethane resin composition according to the present invention can be suitably used as a material for synthetic leather.

Next, a synthetic leather in which the urethane resin composition according to the present invention is used as a material for a skin layer will be described.

Examples of the synthetic leather include a synthetic leather including at least a base fabric and a skin layer.

Examples of the base fabric that can be used include: a plastic substrate; and a fiber substrate, such as nonwoven fabrics, woven fabrics, and knitted fabrics. Of these substrates, the fiber substrate is preferably used from the viewpoint of achieving good softness. Examples of a material constituting the fiber substrate that can be used include polyester fibers, nylon fibers, acrylic fibers, acetate fibers, rayon fibers, polylactic acid fibers, cotton, hemp, silk, wool, and fiber mixtures thereof.

The thickness of the skin layer is, for example, within a range of 5 to 100 μm.

The synthetic leather may further include one or more layers selected from the group consisting of a wet porous layer, an intermediate layer, a bonding layer, and a surface-treated layer, if necessary. Well-known materials can be used as any materials constituting these layers.

EXAMPLES

Hereinafter, the present invention will be described in more detail by way of Examples.

Example 1

A four-neck flask equipped with a stirrer, a reflux condenser, a thermometer, and a nitrogen gas introduction tube was charged, under a nitrogen flow, with 100 parts by mass of polycarbonate polyol produced using 1,4-butanediol and biomass-derived 1,10-decanediol as raw materials (molar ratio [(C4)/(C10)]=90/10, number average molecular weight: 3,000, hereinafter abbreviated as "Bio-PC (1)" and 11.1 parts by mass of polycarbonate polyol produced using 1,4-butanediol and biomass-derived isosorbide as raw materials (molar ratio [(C4)/(ISB)]=60/40, number average molecular weight: 800, hereinafter abbreviated as "Bio-PC (4)"), and furthermore charged with 194 parts by mass of methyl ethyl ketone and 4.4 parts by mass of 2,2-dimethylolpropionic acid (hereinafter abbreviated as "DMPA"). The mixture was sufficiently stirred and mixed. Then, 29.4 parts by mass of dicyclohexylmethane diisocyanate (hereinafter abbreviated as "HMDI") was added to the mixture, and subsequently 0.03 part by mass of bismuth carboxylate was added thereto. The resultant mixture was allowed to react at 75° C. for approximately 4 hours, whereby a methyl ethyl ketone solution of a urethane prepolymer having an isocyanate group was obtained.

Subsequently, 4.0 parts by mass of triethylamine was added to the methyl ethyl ketone solution to neutralize a carboxyl group in the urethane prepolymer. After the completion of the neutralization, 460 parts by mass of ion-exchanged water was added, and then 2.2 parts by mass of piperazine (hereinafter abbreviated as "Pip") was added, and the resultant mixture was allowed to react. After the completion of the reaction, methyl ethyl ketone was removed by evaporation under reduced pressure, whereby a urethane resin composition (non-volatile content: 28% by mass, acid value: 13 mgKOH/g) was obtained.

Example 2

A urethane resin composition was obtained in the same manner as in Example 1, except that 29.4 parts by mass of HMDI in Example 1 was changed to 24.9 parts by mass of isophorone diisocyanate (hereinafter abbreviated as "IPDI"), and 2.2 parts by mass of Pip in Example 1 was changed to 2.6 parts by mass thereof.

Example 3

A urethane resin composition was obtained in the same manner as in Example 1, except that 29.4 parts by mass of HMDI in Example 1 was changed to 14.7 parts by mass of HMDI and 9.4 parts by mass of hexane diisocyanate (hereinafter abbreviated as "HDI"), and 2.2 parts by mass of Pip in Example 1 was changed to 2.5 parts by mass thereof.

Example 4

A urethane resin composition was obtained in the same manner as in Example 1, except that the Bio-PC (1) in Example 1 was changed to polycarbonate polyol produced using 1,4-butanediol and biomass-derived 1,10-decanediol as raw materials (molar ratio [(C4)/(C10)]=90/10, number average molecular weight: 2,000, hereinafter abbreviated as "Bio-PC (2)").

Example 5

A urethane resin composition was obtained in the same manner as in Example 1, except that the Bio-PC (4) in Example 1 was changed to polycarbonate polyol produced using 1,6-hexanediol and biomass-derived isosorbide as raw materials (molar ratio [(C6)/(ISB)]=60/40, number average molecular weight: 800, hereinafter abbreviated as "Bio-PC (5)").

Example 6

A urethane resin composition was obtained in the same manner as in Example 1, except that 100 parts by mass of the Bio-PC (1) in Example 1 was changed to 89 parts by mass thereof, 11.1 parts by mass of the Bio-PC (4) in Example 1 was changed to 22.2 parts by mass thereof, 29.4 parts by mass of HMDI in Example 1 was changed to 33.1 parts by mass thereof, and 2.2 parts by mass of Pip in Example 1 was changed to 2.5 parts by mass thereof.

Example 7

A urethane resin composition was obtained in the same manner as in Example 1, except that 100 parts by mass of the Bio-PC (1) in Example 1 was changed to 77.7 parts by mass thereof, 11.1 parts by mass of the Bio-PC (4) in Example 1 was changed to 33.3 parts by mass thereof, 29.4 parts by mass of HMDI in Example 1 was changed to 36.7 parts by mass thereof, and 2.2 parts by mass of Pip in Example 1 was changed to 2.8 parts by mass thereof.

Example 8

A urethane resin composition was obtained in the same manner as in Example 1, except that the Bio-PC (1) in Example 7 was changed to polycarbonate polyol produced using 1,4-butanediol and biomass-derived 1,10-decanediol as raw materials (molar ratio [(C4)/(C10)]=70/30, number average molecular weight: 3,000, hereinafter abbreviated as "Bio-PC (3)").

Example 9

A urethane resin composition was obtained in the same manner as in Example 1, except that 2.2 parts by mass of Pip in Example 1 was changed to 4.4 parts by mass of isophoronediamine (hereinafter abbreviated as "IPDA").

Comparative Example 1

A four-neck flask equipped with a stirrer, a reflux condenser, a thermometer, and a nitrogen gas introduction tube was charged with 100 parts by mass of the Bio-PC (1), and furthermore charged with 170 parts by mass of methyl ethyl ketone and 4.0 parts by mass of DMPA. The mixture was sufficiently stirred and mixed. Then, 23.1 parts by mass of HMDI was added to the mixture, and subsequently 0.03 part by mass of bismuth carboxylate was added thereto. The resultant mixture was allowed to react at 75° C. for approximately 4 hours, whereby a methyl ethyl ketone solution of a urethane prepolymer having an isocyanate group was obtained.

Subsequently, 3.6 parts by mass of triethylamine was added to the methyl ethyl ketone solution to neutralize a carboxyl group in the urethane prepolymer. After the completion of the neutralization, 404 parts by mass of ion-exchanged water was added, and then 1.7 parts by mass of piperazine, Pip, was added, and the resultant mixture was allowed to react. After the completion of the reaction, methyl ethyl ketone was removed by evaporation under reduced pressure, whereby a urethane resin composition (non-volatile content: 28% by mass, acid value: 17 mgKOH/g) was obtained.

Comparative Example 2

A four-neck flask equipped with a stirrer, a reflux condenser, a thermometer, and a nitrogen gas introduction tube was charged with 100 parts by mass of the Bio-PC (4), and furthermore charged with 216 parts by mass of methyl ethyl ketone and 4.0 parts by mass of DMPA. The mixture was sufficiently stirred and mixed. Then, 57 parts by mass of HMDI was added to the mixture, and subsequently 0.03 part by mass of bismuth carboxylate was added thereto. The resultant mixture was allowed to react at 75° C. for approximately 4 hours, whereby a methyl ethyl ketone solution of a urethane prepolymer having an isocyanate group was obtained.

Subsequently, 3.6 parts by mass of triethylamine was added to the methyl ethyl ketone solution to neutralize a carboxyl group in the urethane prepolymer. After the completion of the neutralization, 503 parts by mass of ion-exchanged water was added, and then 4.4 parts by mass of Pip was added, and the resultant mixture was allowed to react. After the completion of the reaction, methyl ethyl ketone was removed by evaporation under reduced pressure, whereby a urethane resin composition (non-volatile content: 28% by mass, acid value: 13 mgKOH/g) was obtained.

Comparative Example 3

A four-neck flask equipped with a stirrer, a reflux condenser, a thermometer, and a nitrogen gas introduction tube was charged with 100 parts by mass of polycarbonate polyol (polycarbonate polyol produced using petroleum-resource-derived hexanediol as a raw material, number average molecular weight; 2,000, hereinafter referred to as "petroleum-based PC"), and furthermore charged with 171 parts by mass of methyl ethyl ketone and 4.0 parts by mass of DMPA. The mixture was sufficiently stirred and mixed. Then, 4.6 parts by mass of HMDI was added to the mixture, and subsequently 0.03 part by mass of bismuth carboxylate was added thereto. The resultant mixture was allowed to react at 75° C. for approximately 4 hours, whereby a methyl ethyl ketone solution of a urethane prepolymer having an isocyanate group was obtained.

Subsequently, 3.6 parts by mass of triethylamine was added to the methyl ethyl ketone solution to neutralize a carboxyl group in the urethane prepolymer. After the completion of the neutralization, 405 parts by mass of ion-exchanged water was added, and then 2.3 parts by mass of Pip was added, and the resultant mixture was allowed to react. After the completion of the reaction, methyl ethyl ketone was removed by evaporation under reduced pressure, whereby a urethane resin composition (non-volatile content: 28% by mass, acid value: 13 mgKOH/g) was obtained.

[Method for Measuring Number Average Molecular Weight]

The number average molecular weight of each of the polyols and other materials used in Examples and Comparative Examples is a value determined by gel permeation chromatography (GPC) under the following conditions.

Measurement Device: High performance GPC ("HLC-8220GPC", manufactured by Tosoh Corporation) Columns: The following columns manufactured by Tosoh Corporation were connected in series and used.

"TSKgel G5000" (7.8 mm I.D.×30 cm)×1

"TSKgel G4000" (7.8 mm I.D.×30 cm)×1

"TSKgel G3000" (7.8 mm I.D.×30 cm)×1

"TSKgel G2000" (7.8 mm I.D.×30 cm)×1

Detector: RI (differential refractometer)
Column Temperature: 40° C.
Eluent: tetrahydrofuran (THF)
Flow Rate: 1.0 mL/minute
Injection Amount: 100 µL (a tetrahydrofuran solution having a sample concentration of 0.4% by mass)
Standard samples: The following types of standard polystyrene were used to produce calibration curves.
(Standard Polystyrene)
"TSKgel standard polystyrene A-500", manufactured by Tosoh Corporation
"TSKgel standard polystyrene A-1000", manufactured by Tosoh Corporation
"TSKgel standard polystyrene A-2500", manufactured by Tosoh Corporation
"TSKgel standard polystyrene A-5000", manufactured by Tosoh Corporation
"TSKgel standard polystyrene F-1", manufactured by Tosoh Corporation
"TSKgel standard polystyrene F-2", manufactured by Tosoh Corporation
"TSKgel standard polystyrene F-4", manufactured by Tosoh Corporation
"TSKgel standard polystyrene F-10", manufactured by Tosoh Corporation
"TSKgel standard polystyrene F-20", manufactured by Tosoh Corporation
"TSKgel standard polystyrene F-40", manufactured by Tosoh Corporation
"TSKgel standard polystyrene F-80", manufactured by Tosoh Corporation
"TSKgel standard polystyrene F-128", manufactured by Tosoh Corporation
"TSKgel standard polystyrene F-288", manufactured by Tosoh Corporation "TSKgel standard polystyrene F-550", manufactured by Tosoh Corporation

[Method for Measuring Acid Value of Anionic Urethane Resin (X)]

The urethane resin composition obtained in each of Examples and Comparative Examples was dried, and 0.05 g to 0.5 g of dried and solidified resin particles were weighed into a 300-mL Erlenmeyer flask. Subsequently, approximately 80 mL of a solvent mixture of tetrahydrofuran and ion-exchanged water at a mass ratio [tetrahydrofuran/ion-exchanged water] of 80/20 was added, whereby a liquid mixture was obtained.

Next, a phenolphthalein indicator was mixed with the liquid mixture. Then, the resulting mixture was titrated with a 0.1-mol/L aqueous solution of potassium hydroxide standardized in advance. The acid value (mgKOH/g) of an anionic Urethane Resin (X) was determined according to the following computational formula (1) by using the amount of the aqueous solution of potassium hydroxide used for the titration.

$$A = (B \times f \times 5.611)/S \quad (1)$$

Computational Formula

In the computational formula (1), A is the acid value (mgKOH/g) of the solid content of the resin; B is the amount (mL) of the 0.1-mol/L aqueous solution of potassium hydroxide used for the titration; f is the factor of the 0.1-mol/L aqueous solution of potassium hydroxide; S is the mass (g) of the resin particles; and 5.611 is the formula weight of potassium hydroxide (56.11/10).

[Methods for Evaluating Abrasion Resistance]

100 parts by mass of each of the urethane resin compositions obtained in Examples and Comparative Examples was mixed with 10 parts by mass of a black pigment "DILAC HS-9530" manufactured by DIC Corporation and 1 part by mass of a thickener "HYDRAN ASSISTER T10" manufactured by DIC Corporation. The resultant liquid mixture was applied onto a release paper sheet ("DE-73M", manufactured by Ajinomoto Trading, Inc.) so as to achieve a solid content film thickness of 30 μm, and dried at 70° C. for 2 minutes, and furthermore dried at 120° C. for 2 minutes, whereby a urethane resin film was produced.

Next, 100 parts by mass of an aqueous urethane resin adhesive "HYDRAN WLA-515AR" manufactured by DIC Corporation, 1 part by mass of a thickener "HYDRAN ASSISTER T10" manufactured by DIC Corporation, and 8 parts by mass of a cross-linking agent "HYDRAN ASSISTER C5" manufactured by DIC Corporation were mixed. The resultant liquid mixture was applied onto the urethane resin film so as to achieve a solid content film thickness of 50 μm, and dried at 100° C. for 1 minute.

Subsequently, a T/R raised fabric was laminated on the film, and the resultant laminate was heat-treated at 120° C. for 2 minutes, and aged at 50° C. for 2 days, and then the release paper sheet was peeled off to obtain a synthetic leather. The synthetic leather was subjected to a Taber abrasion test (JIS L 1096:2010, abrasion wheel: CS-10, load: 1 kg, number of revolutions: 70 rpm, number of times of the test: 1,000 times). Then, a surface of the synthetic leather was observed and evaluated as follows.

"A": No tear.

"B": Small tear in the surface.

"C": Large tear, which causes the base fabric to be exposed.

[Method for Evaluating Oleic-Acid Resistance]

100 parts by mass of each of the urethane resin compositions obtained in Examples and Comparative Examples was mixed with 1 part by mass of a thickener ("HYDRAN ASSISTER T10", manufactured by DIC Corporation). The resultant liquid mixture was applied onto a flat release paper sheet ("EK-100D", manufactured by LINTEC Corporation) so as to achieve a dry film thickness of 30 μm, and dried at 70° C. for 2 minutes, then dried at 120° C. for 2 minutes, whereby a urethane film was obtained. Subsequently, the urethane film was cut into strip pieces each having a width of 5 mm and a length of 50 mm, and the resultant pieces were used as test specimens. Using a tensile tester ("Autograph AG-I", manufactured by Shimadzu Corporation), one of the test specimens was subjected to a tensile test under the conditions of a chuck distance of 40 mm, a tensile speed of 10 mm/second, and a temperature of 23° C., and thus, a stress at 100% elongation (100% modulus value, hereinafter referred to as "100% M (1)") was measured.

Subsequently, another one of the test specimens was immersed in oleic acid at 23° C. for 24 hours. Then, the test specimen was taken out, and oleic acid attached to a surface of the test specimen was wiped away. Then, a 100% modulus value (hereinafter referred to as "100% M (2)") was measured in the same manner as for the 100% M (1). Retention was calculated by dividing the 100% M (2) by the 100% M (1), and evaluated as follows.

"A": The retention was 50% or more.

"B": The retention was 30% or more and less than 50%.

"C": The retention was less than 30%.

[Method for Evaluating Low-temperature Flexibility]

A synthetic leather was obtained in the same manner as described in the [Method for Evaluating Abrasion Resistance]. The obtained synthetic leather was subjected to a flexibility test (at −10° C., 100 times per minute) using a flexometer ("Flexometer equipped with cryostat" manufactured by YASUDA SEIKI SEISAKUSHO, LTD.), and the number of times of the test performed until a crack appeared in a surface of the synthetic leather was measured, and the low-temperature flexibility was evaluated as follows.

"A": 30,000 times or more.

"B": 10,000 times or more and less than 30,000 times.

"C": Less than 10,000 times.

TABLE 1

| | | | Example 1 | Example 2 | Example 3 |
|---|---|---|---|---|---|
| Urethane resin (X) | Polyol (A) Polycarbonate polyol (A-1) produced using biomass-derived decanediol as raw material | Type | Bio-PC (1) | Bio-PC (1) | Bio-PC (1) |
| | | Molar ratio | [[C4/C10] = 90/10 | [[C4/C10] = 90/10 | [[C4/C10] = 90/10 |
| | | Mn | 3,000 | 3,000 | 3,000 |

TABLE 1-continued

|  |  |  |  |  |  |
|---|---|---|---|---|---|
|  | Polycarbonate polyol (A-2) produced using biomass-derived dihydroxy compound with cyclic ether structure as raw material | Type Molar ratio Mn | Bio-PC (4) [[C4/ISB] = 60/40 800 | Bio-PC (4) [C4/ISB] = 60/40 800 | Bio-PC (4) [C4/ISB] = 60/40 800 |
|  | Other polyols | Type Molar ratio |  |  |  |
|  | Polyisocyanate (B) |  | H12MDI | IPDI | H12MDI HDI |
|  | Chain extender (C) |  | Pip | Pip | Pip |
| Evaluation of abrasion resistance |  |  | A | A | A |
| Evaluation of oleic acid resistance |  |  | A | A | A |
| Evaluation of low-temperature flexibility |  |  | A | A | A |

|  |  |  | Example 4 | Example 5 | Example 6 |
|---|---|---|---|---|---|
| Urethane resin (X) | Polyol (A) | Type |  |  |  |
|  | Polycarbonate polyol (A-1) produced using biomass-derived decanediol as raw material | Molar ratio Mn | Bio-PC (2) [C4/C10] = 90/10 2,000 | Bio-PC (1) [C4/C10] = 90/10 3,000 | Bio-PC (1) [C4/C10] = 90/10 3,000 |
|  | Polycarbonate polyol (A-2) produced using biomass-derived dihydroxy compound with cyclic ether structure as raw material | Type Molar ratio Mn | Bio-PC (4) [C4/ISB] = 60/40 800 | Bio-PC (5) [C6/ISB] = 60/40 800 | Bio-PC (4) [C4/ISB] = 60/40 800 |
|  | Other polyols | Type Molar ratio |  |  |  |
|  | Polyisocyanate (B) |  | H12MDI | H12MDI | H12MDI |
|  | Chain extender (C) |  | Pip | Pip | Pip |
| Evaluation of abrasion resistance |  |  | A | A | A |
| Evaluation of oleic acid resistance |  |  | A | A | A |
| Evaluation of low-temperature flexibility |  |  | A | A | A |

TABLE 2

|  |  |  | Example 7 | Example 8 | Example 9 |
|---|---|---|---|---|---|
| Urethane resin (X) | Polyol (A) |  |  |  |  |
|  | Polycarbonate polyol (A-1) produced using biomass-derived decanediol as raw material | Type Molar ratio Mn | Bio-PC (1) [C4/C10] = 90/10 3,000 | Bio-PC (3) [C4/C10] = 70/30 3,000 | Bio-PC (1) [C4/C10] = 90/10 3,000 |
|  | Polycarbonate polyol (A-2) produced using biomass-derived dihydroxy compound with cyclic ether structure as raw material | Type Molar ratio Mn | Bio-PC (4) [C4/ISB] = 60/40 800 | Bio-PC (4) [C4/ISB] = 60/40 800 | Bio-PC (4) [C4/ISB] = 60/40 800 |
|  | Other polyols | Type Molar ratio |  |  |  |
|  | Polyisocyanate (B) |  | H12MDI | H12MDI | H12MDI |
|  | Chain extender (C) |  | Pip | Pip | IPDA |
| Evaluation of abrasion resistance |  |  | A | A | A |
| Evaluation of oleic acid resistance |  |  | A | A | A |
| Evaluation of low-temperature flexibility |  |  | A | A | A |

TABLE 2-continued

| | | | Comparative Example 1 | Comparative Example 2 | Comparative Example 3 |
|---|---|---|---|---|---|
| Urethane resin (X) | Polyol (A) | | | | |
| | Polycarbonate polyol (A-1) produced using biomass-derived decanediol as raw material | Type | Bio-PC (1) | | |
| | | Molar ratio | [C4/C10] = 90/10 | | |
| | | Mn | 3,000 | | |
| | Polycarbonate polyol (A-2) produced using biomass-derived dihydroxy compound with cyclic ether structure as raw material | Type | | Bio-PC (4) | |
| | | Molar ratio | | [C4/ISB] = 60/40 | |
| | | Mn | | 800 | |
| | Other polyols | Type | | | Petroleum-based PC |
| | | Molar ratio | | | [C6] = 100 |
| | Polyisocyanate (B) | | H12MDI | H12MDI | H12MDI |
| | Chain extender (C) | | Pip | Pip | Pip |
| Evaluation of abrasion resistance | | | C | A | C |
| Evaluation of oleic acid resistance | | | A | A | C |
| Evaluation of low-temperature flexibility | | | A | C | C |

It was found that the urethane resin compositions according to the present invention, which were produced using a biomass raw material, had high abrasion resistance, high oleic-acid resistance, and excellent low-temperature flexibility.

In contrast, Comparative Example 1, which was an aspect not using the polycarbonate polyol (A-2), resulted in poor abrasion resistance.

Comparative Example 2, which was an aspect not using the polycarbonate polyol (A-1), resulted in poor low-temperature flexibility.

Comparative Example 3, which was an aspect in which, instead of the polycarbonate polyol (A-1), a polycarbonate polyol produced using petroleum-resource-derived hexanediol was used as a raw material, resulted in poor abrasion resistance, poor oleic-acid resistance, and poor low-temperature flexibility.

The invention claimed is:

1. A urethane resin composition comprising:
an anionic urethane resin (X); and
water (Y), wherein
the anionic urethane resin (X) is produced using, as raw materials, a polycarbonate polyol (A-1) produced using biomass-derived decanediol as a raw material, and a polycarbonate polyol (A-2) produced using a biomass-derived dihydroxy compound having a cyclic ether structure as a raw material,
an acid value of the anionic urethane resin (X) is within a range of 5 to 15 mgKOH/g.

2. The urethane resin composition according to claim 1, wherein the polycarbonate polyol (A-1) is produced further using a butanediol as a raw material.

3. The urethane resin composition according to claim 2, wherein a molar ratio [(C4)/(C10)] of the butanediol (C4) to the biomass-derived decanediol (C10) in the polycarbonate polyol (A-1) is within a range 50/50 to 98/2.

4. The urethane resin composition according to claim 1, wherein the polycarbonate polyol (A-2) is produced further using butanediol and/or hexanediol as raw materials.

5. The urethane resin composition according to claim 4, wherein a molar ratio [(C4+C6)/(ISB)] of a total of the butanediol (C4) and the hexanediol (C6) to the biomass-derived dihydroxy compound (ISB) having the cyclic ether structure in the polycarbonate polyol (A-2) is within a range of 30/70 to 90/10.

6. The urethane resin composition according to claim 1, wherein the biomass-derived dihydroxy compound having the cyclic ether structure is a biomass-derived isosorbide.

7. A film formed from the urethane resin composition according to claim 1.

8. A synthetic leather including the film according to claim 7.

* * * * *